3,242,100
METHOD FOR MANUFACTURING HYDROCRACKING CATALYSTS
Hugh F. Harnsberger, San Anselmo, Bernard F. Mulaskey, Richmond, and Donald A. Hickson, San Pablo, Calif., assignors to Chevron Research Company, a corporation of Delaware
Filed Mar. 7, 1962, Ser. No. 178,074
6 Claims. (Cl. 252—439)

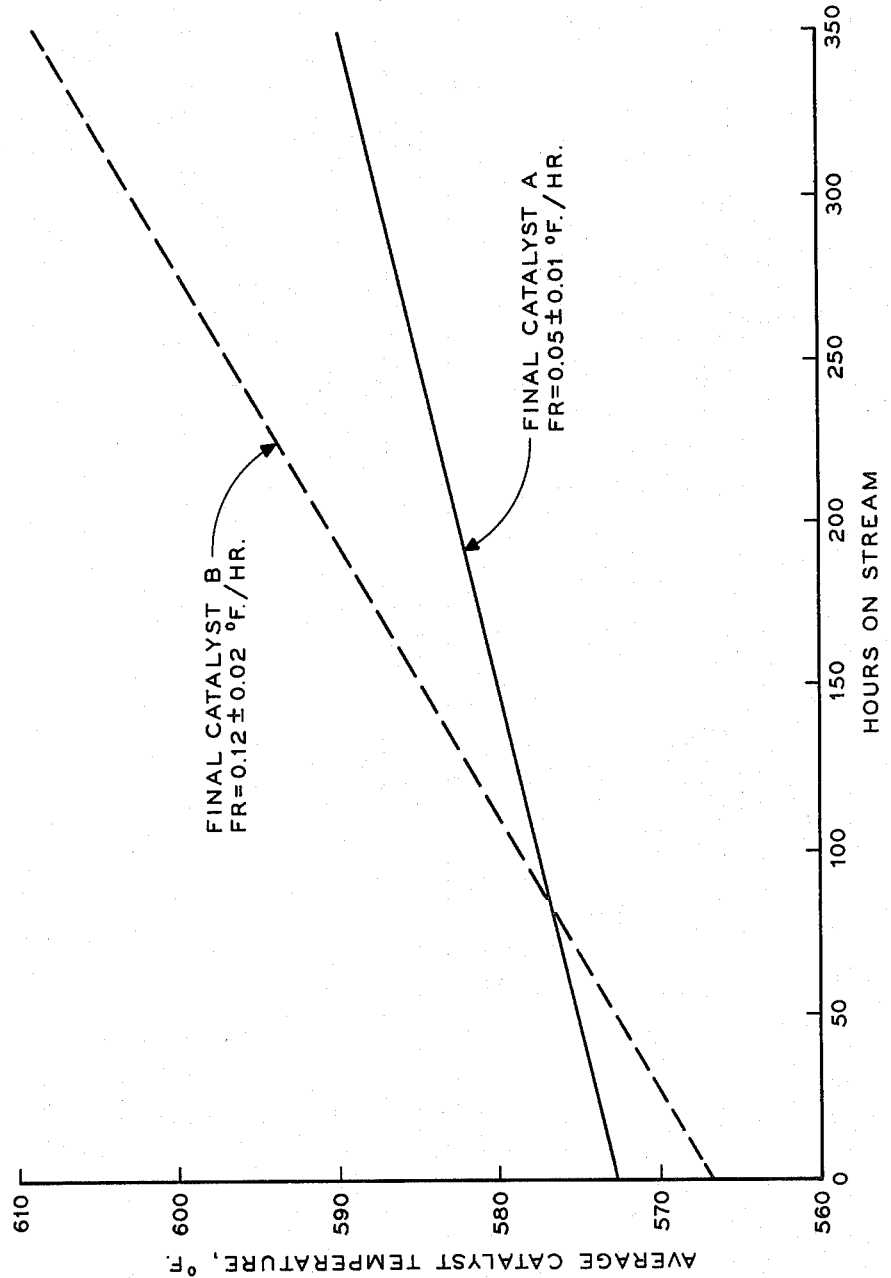

This invention relates to a method for manufacturing hydrocracking catalysts, and, more particularly, to a method for manufacturing hydrocracking catalysts characterized by both high hydrocracking activities and high resistance to catalyst poisons normally contained in the feed stocks to be converted by the catalysts under the hydrocracking conditions employed.

As is well known to those skilled in the petroleum refining art, hydrocracking is a reaction wherein mixtures of hydrocarbons are converted to lower boiling products in the presence of added hydrogen and a catalyst at elevated temperatures and pressures. One of the major lines of development that has occurred in the hydrocracking art has been the employment of catalysts comprising acidic supports, particularly silica-alumina composites, having at least one hydrogenating-dehydrogenating component disposed thereon. In the earlier stages of development, temperatures on the order of 850° to 1100° F. and pressures in excess of 3000 p.s.i.g. were characteristic of the process. More recently, it has been found that naturally-occurring petroleum constituents, such as nitrogen-containing compounds, adversely affect the catalyst. If these undesirable compounds are removed, as by hydrofining, lower operating temperatures and pressures and longer catalyst on-stream life are realized if the proper catalyst is employed. This result is, of course, desirable since it allows a considerable reduction in high temperature and pressure equipment, and the desired liquid products are at a maximum due to the reduction in coke and light gas production at the lower temperatures and pressures.

It has now been found that further improvements, particularly in catalyst activity and the extension of effective on-stream life of the hydrocracking catalyst having silica-alumina composites as the catalyst support, can be realized. Thus, it has been discovered that both fouling rate, i.e., the rate at which a catalyst is deactivated by catalyst poisons and coke deposition, and the hydrocracking activity of silica-alumina supported hydrocracking catalysts are apparently greatly affected by the manufacturing procedure for producing the silica-alumina support. More specifically, we have found that, by following a clearly defined method for manufacturing the silica-alumina support, catalyst fouling is considerably reduced while catalyst hydrocracking activity is at a very high level. The present invention is directed to a method for manufacturing a hydrocracking catalyst comprising a silica-alumina support upon which is disposed a hydrogenating-dehydrogenating component which comprises the following sequence of steps:

(a) Comixing an aqueous aluminum salt in an acidic medium and an aqueous alkali metal silicate at a temperature of from about 20° to 100° F. to produce a silicia-alumina hydrocogel;

(b) Slurrying said hydrocogel with an aqueous aluminum salt at a temperature less than about 100° F. for at least 10 minutes, thereby removing alkali metal by cation exchange and increasing the alumina content of said hydrocogel;

(c) Separating the aqueous phase from the resulting slurry to produce a silica-alumina cogel;

(d) Contacting said cogel at a pH between about 4 and 5.5 with a thermally decomposable aqueous cation exchange salt, said cation exchange salt having a concentration of at least 1% in the aqueous solution, thereby removing essentially all of the remaining alkali metal from said cogel;

(e) Reducing the final particle density and simultaneously increasing the surface area of said cogel in the presence of a solution of ammonium salt having a concentration from about 1 to 20 weight percent for at least 0.25 hour at a temperature above 150° F.;

(f) Calcining said cogel at a temperature above 900° F. to produce a silica-alumina xerogel as said catalyst support; and (g) Thereafter depositing said hydrogenating-dehydrogenating component on said support to produce said hydrocracking catalyst.

As noted, the aqueous aluminum salt, in an acidic medium, and the aqueous alkali metal silicate are thoroughly admixed. The aqueous aluminum salt can be, for example, aluminum nitrate, aluminum acetate, and, preferably, aluminum sulfate, which is acidified by the inclusion of concentrated mineral acids as, for example, sulfuric acid, hydrochloric acid or nitric acid. The amount of acid employed is adjusted so that the final pH of the mixture of aqueous aluminum salt and aqueous alkali metal silicate is from about 6.2 to 7.5.

The alkali metal silicate solution, preferably sodium silicate, is thoroughly admixed with the aqueous aluminum salt. The quantities of each solution will depend upon the proportions of silica and alumina desired in the finished cogel support; preferably, it is advantageous to employ equal volumetric amounts of the reactants in the respective concentrations furnishing the required silica-alumina ratio. Since some alumina is added in the cation exchange step described below, the amount must enter into the determination of the final concentration of the aluminum salt used during the formation of the hydrocogel. The proportions of aluminum salt and alkali metal silicate may be selected to furnish a final cogel containing from about 20 to 98% silica and from 80 to 2% alumina; preferably, the proportions will lie in the range of from about 50 to 90% silica and 50 to 10% alumina. If desired, other components or promoters may be present.

The hydrocogel is prepared by comixing the acidic aqueous aluminum salt and the aqueous alkali metal silicate, and the forming of it undertaken by any conventional technique. For example, the hydrocogel can be formed into beads, extrudates, microspheres or compression pellets, by means well known in the art.

As a result of the mixing of the aluminum salt and alkali metal silicate, a hydrocogel is produced that will have a density normally greater than 1.3. No attempt to reduce the density of the hydrocogel below 1.3 should be made at this stage in the procedure.

After the formation of the silica-alumina hydrocogel, an important feature of the present process is that the alkali salt containing-hydrocogel not be subjected to any drying or partial drying operation involving temperatures in excess of about 100° F. Instead, the hydrocogel is cation exchanged by contact for at least 10 minutes with an aqueous aluminum salt, preferably aluminum sulfate, at a temperature below about 100° F. This cation exchange step removes a considerable portion of the alkali metal ions originally present in the hydrocogel. Further, the cation exchange step can be done in a plurality of stages by a series involving filtering to remove the aqueous phase, thereby producing a silica-alumina cogel, and then recontacting the cogel with the cation exchange solution. A plurality of cation exchange steps can be employed with intermediate filtering to remove each aqueous phase. The plurality of steps will reduce the alkali metal content of the cogel progressively. In any case, the resulting slurry mixture of silica-alumina hydrocogel, along with the cation exchange solution, are filtered to produce a silica-alumina cogel.

The resulting cogel is then contacted at a pH between about 4 and 5.5 with a thermally decomposable aqueous cation exchange salt of a concentration such that it contains at least 1 weight percent of the cation exchange salt. This secondary cation exchange step is done to remove essentially all of the remaining alkali metal ions from the silica-alumina cogel. The critical factor insofar as the particular cation exchange salt to be employed at this stage in the method is that the cation exchange agent exists at a pH of from about 4 to 5.5 and, further, that it is thermally decomposable at or below the calcining temperatures described below. This cation exchange solution should not include any alkali metal. Preferably, the solution here employed is an aqueous solution containing at least one percent ammonium chloride.

The resulting cogel, now essentially free of alkali metal ions, is contacted with a solution of an ammonium salt having a concentration of from about 1 to 20 weight percent for at least 4 hours at a temperature above 150° F. so as to reduce the particle density and simultaneously increase the surface area of the final cogel. In this manner, after calcining as described below, the particle density is reduced below 1.1 g./ml. and preferably to about 1.0 g./ml. The surface area will simultaneously increase to above 300, and preferably 400, m.²/g.

The cogel, now reduced in particle density and with a high surface area, is subjected to heat treatment (calcining) at an elevated temperature above 900° F. and, preferably, in the range of from about 1000° to 1500° F. This calcining effects a hardening of the cogel, stabilizes the structure and activity of the support, and removes essentially all of the remaining ammonium chloride, to produce a purified xerogel.

The hydrogenating-dehydrogenating component is then disposed on the now-produced xerogel support in any manner known to the art although deposition by impregnation is preferred. The actual hydrogenation-dehydrogenation components can be selected from any one or more of the various Groups VI and VIII metals as well as the oxides and sulfides thereof, representative materials being the oxides and sulfides of molybdenum, tungsten, chromium and the like, and such metals as nickel and cobalt and the various oxides and sulfides thereof. If desired, more than one hydrogenating-dehydrogenating component may be present, e.g., composites of two or more of the oxides and sulfides of molybdenum, cobalt and nickel.

The amount of the hydrogenating-dehydrogenating component may be varied within relatively wide limits of from about 0.1 to 35% based on the weight of the entire catalyst composition. Particularly good results, from the standpoint of catalyst selectivity and the ability of the catalyst to withstand repeated regenerations with relatively minor decreases in acivity, are obtained with a catalyst comprising from 1 to 35% nickel and/or cobalt sulfides and/or oxides.

The following examples show advantages of using the catalyst support manufacturing method of the present invention. Example 1 describes the method of manufacturing the catalyst of the present invention. The other examples are inserted for comparative purposes, and show activity and fouling rate tests of the subject catalyst as compared to catalysts prepared from commercially available silica-alumina cracking catalysts used as catalyst supports.

*Example 1*

The silica-alumina hydrocogel is made by mixing together two solutions, herein called solution 1 and solution 2. Solution 1 contains 392 grams of $$Al_2(SO_4)_3 \cdot 18H_2O$$

110.8 grams of concentrated sulfuric acid and 6368 grams of water. Solution 2 contains technical grade N-sodium silicate ($Na_2SiO_3$), 3220 grams of solution with 4360 grams of water. The two solutions were thoroughly admixed at a low temperature by a high speed mixing apparatus. The temperature employed was from 42° to 47° F. These solutions were displaced from vessels with oil. The oil was pumped into the vessels at a known rate with a gear pump. In this way, control was maintained over the flow rate of both solutions coming out of the high speed mixer. Solution was spewed out of the bottom of the high speed mixer onto trays where the temperature and gel time were noted. The speed of the pump was varied to give a pH of the resulting hydrocogel, when mixed with an equal amount of water, of about 7. The pH of the hydrocogel produced varied from about 6.2 to 7.5, and the gel time was from about 34 to 40 seconds. After the two solutions had been mixed and gelled in the trays, it was scraped off and dumped into a large kettle which contained a cation exchange solution, herein referred to as solution 3. Solution 3 contained 572 grams of aluminum sulfate, $$Al_2(SO_4)_3 \cdot 18H_2O$$

and 13,714 grams of water.

The hydrocogel was slurried when it was contacted with solution 3 in the large kettle. After the hydrocogel slurry had been in contact at room temperature (about 70° F.) for over 4 hours, it was filtered to remove the aqueous phase, thereby producing a silica-alumina cogel having much of the sodium removed therefrom by cation exchange with solution 3.

The next procedure consisted of cation exchanging the sodium remaining on the cogel by treating with an ammonium chloride solution. This was done by treating with various concentrations of ammonium chloride solution and filtering. A total of 10 cation exchange and filtration steps were used. The first three were done with 10% ammonium chloride solution at room temperature. The pH of the ammonium chloride solution was adjusted to remain about 4.5 to 4.7. The sodium content was slowly decreased through the first three washes from 2200 p.p.m. to 850 p.p.m. Steps 4 through 10 consisted of cation exchanging with a 1% by weight ammonium chloride solution. This further reduced the sodium content to less than 500 p.p.m. at the conclusion of the final operation. Throughout the cation exchanging operation, the final particle density and surface area of the catalyst did not vary appreciably.

After removing essentially all of the sodium from the silica-alumina cogel, the particle density of the cogel was reduced by heating in the presence of a solution of 1% by weight ammonium chloride. Temperatures employed were above 150° F., normally above about 190° F. Several runs were made on the reduction of particle density. In one case, particle density was reduced from 1.5 down to 0.92. Other runs reduced the particle density from 1.6 to 1.1 and at the same time increased the surface area of the material from 348 m.²/g. to 501 m.²/g.

The silica-alumina cogel was then calcined by heating at 1000° F. in an oven for several hours. This completed the manufacture of the hydrocracking catalyst support of the present invention.

*Example 2*

The cogelled catalyst support prepared in the manner described in Example 1 was compared with a number of commercial silica-alumina cracking catalysts (four different manufacturers) likewise used as a hydrocracking catalyst support. The physical characteristics of the support made according to the present invention (Catalyst Support A) and these commercial catalysts are shown in Table I.

TABLE I

| Silica-Alumina Support | $N_2$ Area, m.$^2$/g. | Bulk Density, g./ml. | $Al_2O_3$, wt. percent | Na, wt. percent |
|---|---|---|---|---|
| Catalyst Support A | 472 | 0.68 | 11.3 | 0.180 |
| Commercial Support B | 500 | 0.73 | 9.5 | 0.078 |
| Commercial Support C | 484 | 0.66 | 9.32 | 0.033 |
| Commercial Support D | 406 | 0.56 | ¹12 | 0.063 |
| Commercial Support E | 400 | 0.58 | 12.0 | 0.063 |
| Commercial Support F | 429 | 0.69 | 14.4 | |
| Commercial Support G | 325 | 0.46 | ¹25 | 0.033 |

¹ Manufacturer's specification.

All of the supports shown in Table I were employed to make hydrocracking catalysts, the procedure being identical in each case. The procedure involved impregnating 8–14 mesh samples with a solution of nickel nitrate. The nickel on the supports amounted to 7.0 weight percent of its total weight. The catalysts were dried in a kiln to 600° F. and then thermactivated by contact for 2.2 hours with hot, dried air (15 s.c.f./min.) at an average temperature of 1427° F. The nickel oxides were then reduced by contacting the catalysts with hydrogen (1.6 s.c.f./hr.) at atmospheric pressure while heating from 60° to 570° F. at 100° F. per hour, and thereafter contacting the catalysts with hydrogen (1.6 s.c.f./hr.) at 1500 p.s.i.g. and 570° F. for one hour. The catalysts were then sulfided by contacting the catalysts with hydrogen sulfide for two hours at 600° F.

The catalysts were then tested in a manner that would clearly show their activity for catalyzing a hydrocracking reaction. In this test, the so-called "activity index" of each catalyst was determined and compared. The higher the activity index, the more active the catalyst is for hydrocracking, since it refers to the degree of conversion to synthetic products.

The test to determine the activity index of the catalyst broadly involves a determination of the conversion of a standard and readily obtainable hydrocarbon feed stock of defined physical and chemical characteristics to products falling below the boiling point of said stock under defined operating conditions. The feedstock employed is a catalytic cycle oil recovered as a distillate fraction from the effluent of a fluid type of catalytic cracking unit, the recovered fraction being one containing essentially equal proportions of aromatics and of paraffins plus naphthenes, and boiling over a range of from approximately 400° to 575° F. (as determined by ASTM D–158) prior to any hydrofining treatment given the feed to reduce its basic nitrogen content to a level below 5 p.p.m., this being the maximum amount permitted in the test feed. The specific test feed employed in obtaining the activity index values of all catalysts given herein was obtained from a fluid catalytic cracking unit being charged with a mixture of light and heavy gas oils cut from a Los Angeles Basin crude. This cycle oil test feed had a gravity of 28° API, an ASTM D–158 start of about 400° F., and a basic nitrogen content of about 175 p.p.m. The test stock was hydrofined by passing the same, along with 3500 s.c.f. of hydrogen per barrel of naphtha, through a hydrofining catalyst containing cobalt oxide (2 percent cobalt) on a coprecipitated molybdena-alumina (9 percent molybdenum) support at a pressure of 800 p.s.i.g., an LHSV of 1, and at a temperature between 700° and 750° F. This hydrofining operation was accompanied by a hydrogen consumption of 300 to 400 s.c.f. of hydrogen per barrel of feed and resulted in a reduction of the basic nitrogen content in the liquid effluent to less than 5 p.p.m. The hydrofined test stock had the following inspections:

TABLE II.—INSPECTIONS OF HYDROFINED CYCLE OIL TEST SAMPLE

| | |
|---|---|
| Gravity, ° API | 30 |
| Aniline point, ° F. | 93 |
| Nitrogen (basic), p.p.m. | Below 5 |
| Aromatics, vol. percent | 48 |
| Olefins, vol. percent | 1 |
| Paraffins plus naphthenes, vol. percent | 51 |
| ASTM Distillation (D–158), percent: | |
| Start | 357 |
| 5 | 420 |
| 10 | 434 |
| 30 | 460 |
| 50 | 476 |
| 70 | 493 |
| 90 | 519 |
| 95 | 532 |
| End point | 570 |

The equipment employed in determining the activity index of the catalyst was a conventional continuous feed pilot unit, operated once-through with hydrocarbon feed and hydrogen gas. It consisted of a cylindrical reaction chamber operated downflow with a preheating section, followed by a section containing the catalyst under test, and enclosed in a temperature controlled metal block to permit controlled temperature operation, together with the necessary appurtenances, such as feed burettes, feed pump, hydrogen supply, condenser, high pressure separator, provided with means for sampling the gas and liquid phases, back-pressure regulators and thermocouples. For accuracy in hydrogen feed, hydrogen was compressed into a hydrogen accumulator or burette whence it was fed to the reactor by displacement with oil fed at at a constant rate from a reservoir by means of a pump.

In testing a catalyst to determine its activity index, the foregoing hydrofined cycle oil test stock, along with 12,000 s.c.f. of hydrogen per barrel of feed, is passed through a mass of catalyst at a liquid hourly space velocity of 2 and at a furnace temperature of 550° F. The run is continued for 14 hours under these conditions, with samples being collected at about 2-hour intervals. These samples are allowed to flash off light hydrocarbons at ambient temperature and pressure, following which a determination is made of the API gravity of each sample. The aniline point of the samples may also be determined when it is desired to obtain an indication of the relative tendency of the particular catalyst to hydrogenate aromatics present in the feed. The individual API gravity values are then plotted and a smooth curve is drawn from which an average value may be obtained. Samples collected at the end of the eighth hour of operation are usually regarded as representative of steady-state operating conditions and may be distilled to determine conversion to product boiling below the initial boiling point of the feed. This conversion under steady test conditions is a true measure of the activity of the catalyst. However, the API gravity rise, that is, the API gravity of the product samples or samples minus the API gravity of the feed, is a rapid and convenient method of characterizing the catalyst which correlates smoothly with conversion. For convenience, the foregoing API gravity rise is referred to as the activity index of the catalyst.

While reference has been made above to the use of a particular catalytic cycle stock in connection with determining the activity index of the catalyst, it is believed that similar activity index values can be obtained with catalytic cycle stocks obtained from other than California crudes provided the sample employed as feed has substantially the same characteristics as that of the feed described above. While the use of such other test feeds may give slightly different absolute values than those described herein, such differences are without influence on conclusions reached relating to catalyst activity inasmuch as the test stock is serving primarily as a relative standard by which to judge the conversion activity of the catalyst.

All of the catalyst were tested and their activity index determined. These and other pertinent data for these catalysts are shown in Table III. In this table, the catalyst prepared according to the present invention is indicated as Final Catalyst A. The other catalysts shown are these employing the commercial silica-alumina supports reported in Table I. Thus, Final Catalyst B has as the catalyst support the silica-alumina support labeled Commercial Support B in Table I. All of the catalysts tested had 6 weight percent (as the metal) of the total weight of the catalyst except Final Catalyst $D_2$, which contained 6.7 weight percent.

TABLE III

| Final Catalyst | Bulk Density, g./ml. | Area, m.²/g. of Catalyst | Activity Index |
|---|---|---|---|
| Final Catalyst A | 0.820 | 322 | 19.0 |
| Final Catalyst B | 0.845 | 320 | 20.2 |
| Final Catalyst C | 0.752 | 389 | 15.2 |
| Final Catalyst $D_1$ | 0.520 | | 11.2 |
| Final Catalyst $D_2$ | 0.512 | 306 | 10.9 |
| Final Catalyst E | 0.590 | 320 | 11.7 |
| Final Catalyst F | 0.640 | 324 | 12.7 |
| Final Catalyst G | 0.520 | | 9.2 |

From the data presented in Table III, it can be seen that only the catalyst prepared by the process of the present invention (Final Catalyst A) and Final Catalyst B had comparable activity indices. Thus, from a hydrocracking activity standpoint, these two catalysts were far superior to any of the others. These two superior catalysts were then subjected to a further test to determine their respective rates of fouling.

*Example 3*

In this fouling rate test, 130 cc. of the catalysts were separately contacted with an identical feedstock and hydrogen in a hydrocracking reactor. The feed was a hydrofined light catalytic cracking unit cycle oil of 30.4° API gravity, having an end point of 550° F. and a total nitrogen content of 0.5 p.p.m. Contact was made at a liquid hourly space velocity (LSHV) of 1.5 at 1200 p.s.i.g. and a hydrogen gas rate of 6500 standard cubic feet (s.c.f.) per barrel. The reaction temperatures were adjusted so that a per-pass conversion of 60% below a 400° F. cut point was maintained. The adjustments necessary to be made upon the reaction temperatures give rise to the fouling rate determinations. Thus, as the catalyst becomes poisoned and coked, higher reaction temperatures are necessary in order to maintain the required 60% conversion of the feed. The more rapid the rate of reaction temperature increase, the more rapid the rate of undesirable catalyst fouling due to poisoning and coking. It is desired to hydrocrack at the lowest possible temperature, since the advantages to on-stream catalyst life, before regeneration or replacement of the catalyst is necessary, are apparent and of decided benefit. In short, the lower the fouling rate of a catalyst, the more desirable it is.

The accompanying figure shows a comparison of Final Catalysts A and B with respect to hours on stream versus the average catalyst temperatures within the hydrocracking reactor. The lines represent average temperature readings taken about once every eight hours during the 350-hour runs. These temperatures were adjusted every eight hours so as to maintain the desired 60% conversion. Very little divergence from this desired conversion value was encountered in either run. From the figure, it will be seen that, although Final Catalyst B had a somewhat lower starting temperature, it rose quite rapidly in comparison with Final Catalyst A, the catalyst of the present invention. Thus, after 350 hours, Final Catalyst B required a temperature of 19° F. higher than that necessary for Final Catalyst A for the identical conversion. The advantages are apparent, particularly when the catalysts are to be employed in low temperature hydrocracking reactions where it is desired to keep reaction temperatures below 800° F., or, as is often the case, below about 700° F.

The fouling rate (FR) can be expressed in terms of temperature and time. Final Catalyst B had an FR of $0.12 \pm 0.02°$ F. per hour, which means that the reaction (and catalyst) temperature had to be increased $0.12 \pm 0.02°$ F. every hour in order to maintain the 60% conversion. Final Catalyst A had an FR of only $0.05 \pm 0.01°$ F. per hour, or, only about 40% of Final Catalyst B.

From the above examples, it can be seen that the catalyst prepared according to the method of the present invention had a hydrocracking activity considerably greater than all but one catalyst using commercial silica-alumina cracking catalysts as the hydrocracking support (Example 2). Furthermore, the one catalyst that had a comparable hydrocracking activity to the subject catalyst had about 2½ times the fouling rate as the catalyst prepared according to the invention (Example 3). The reasons for this proven superiority are not known definitely. With everything the same in all of the tested catalysts except the support, it is apparent that there must be a difference in the method of its manufacture despite the fact that the actual methods used by the various catalyst suppliers are not definitely known. We feel that an important feature of the method resides in the removal of essentially all alkali metal by cation exchange before any relatively high temperature treatments are used to control the particle density and surface area. It is also believed that another important feature of this catalyst preparation resides in the control of particle density and surface area in the step prior to dehydration of the hydrocogel rather than in the early aluminum sulfate exchange step that is employed in conventional practice. In any case, it is obvious that the method herein claimed to produce the support produces a superior hydrocracking catalyst than could be known or suspected.

Although the catalyst manufacturing method of the present invention is adaptable for any hydrocracking process, it is especially suitable as a catalyst in the so-called low temperature hydrocracking processes. A detailed description of such a process will be found in John W. Scott U.S. Patent No. 2,944,006, issued July 5, 1960.

Briefly, this patent covers a hydrocracking process wherein hydrocarbon distillates having a total nitrogen content of less than 10 p.p.m., along with at least 1500 s.c.f. of hydrogen per barrel of feed, are contacted with a hydrocracking catalyst. This catalyst comprises from about 0.1% to about 35% by weight (as metal) of the total catalyst of nickel sulfide and/or cobalt sulfide as the hydrogenating-dehydrogenating component dispersed on an active siliceous catalyst support. The contacting step in the hydrocracking zone is effected at hydrogen partial pressures of at least 350 p.s.i.g. and at temperatures below about 700° F., and the reaction is further characterized by the consumption of at least 500 s.c.f. of hydrogen per barrel of feed converted to products boiling below the initial boiling point of the feed.

Although only specific modes of operation of the method of the present invention have been described, numerous variations could be made in these modes without departing from the spirit of the invention, and all such variations that fall within the scope of the appended claims are intended to be embraced thereby.

We claim:
1. A method of manufacturing a hydrocracking catalyst comprising a silica-alumina support upon which is disposed a hydrogenating-dehydrogenating component which comprises the following sequence of steps:
   (a) comixing an aqueous aluminum salt in an acidic medium and an aqueous alkali metal silicate at a temperature of about from 20° to 100° F., to produce a silica-alumina hydrocogel;
   (b) slurrying said hydrocogel with an aqueous aluminum salt at a temperature less than about 100° F. for at least 10 minutes, thereby removing alkali metal by cation exchange and increasing the almina content of said hydrocogel;
   (c) separating the aqueous phase from the resulting slurry to produce a silica-alumina cogel;
   (d) contacting said cogel at a pH between about 4 and 5.5 with a thermally decomposable aqueous cation exchange salt, said cation exchange salt having a concentration of at least one weight percent in the aqueous solution, thereby removing essentially all of the remaining alkali metal from said cogel;
   (e) reducing the final particle density and simultaneously increasing the surface area of said cogel by heating said cogel in the presence of a solution of an ammonium salt having a concentration of from about 1 to 20 weight percent for at least 0.25 hours at a temperature above 150° F.;
   (f) calcining said cogel at a temperature above 900° F. to produce silica-alumina xerogel as said catalyst support; and
   (g) thereafter depositing said hydrogenating-dehydrogenating component on said support to produce said hydrocracking catalyst.

2. The method of claim 1, wherein step (a) the aqueous aluminum salt is aluminum sulfate.

3. The method of claim 1, wherein in step (a) the aqueous alkali metal silicate is sodium silicate.

4. The method of claim 1, wherein in step (b) the aqueous aluminum salt is aluminum sulfate.

5. The method of claim 1, wherein in step (d) the thermally decomposable aqueous cation exchange salt is ammonium chloride.

6. The method of claim 1, wherein in step (g) the hydrogenating-dehydrogenating component is selected from the group consisting of nickel sulfide and cobalt sulfide.

References Cited by the Examiner

UNITED STATES PATENTS

| | | | |
|---|---|---|---|
| 2,348,647 | 5/1944 | Reeves et al. | 252—453 |
| 2,453,585 | 11/1948 | Payne et al. | 252—455 X |
| 2,456,721 | 12/1948 | Milliken et al. | 252—452 |
| 2,870,082 | 1/1959 | Sieg et al. | 252—453 X |
| 3,017,368 | 1/1962 | Elliott et al. | 252—439 |
| 3,137,656 | 6/1964 | Mason et al. | 252—439 |

MAURICE A. BRINDISI, *Primary Examiner.*